March 27, 1934.  G. J. RANQUE  1,952,281
METHOD AND APPARATUS FOR OBTAINING FROM A FLUID UNDER PRESSURE
TWO CURRENTS OF FLUIDS AT DIFFERENT TEMPERATURES
Filed Dec. 6, 1932    3 Sheets-Sheet 1
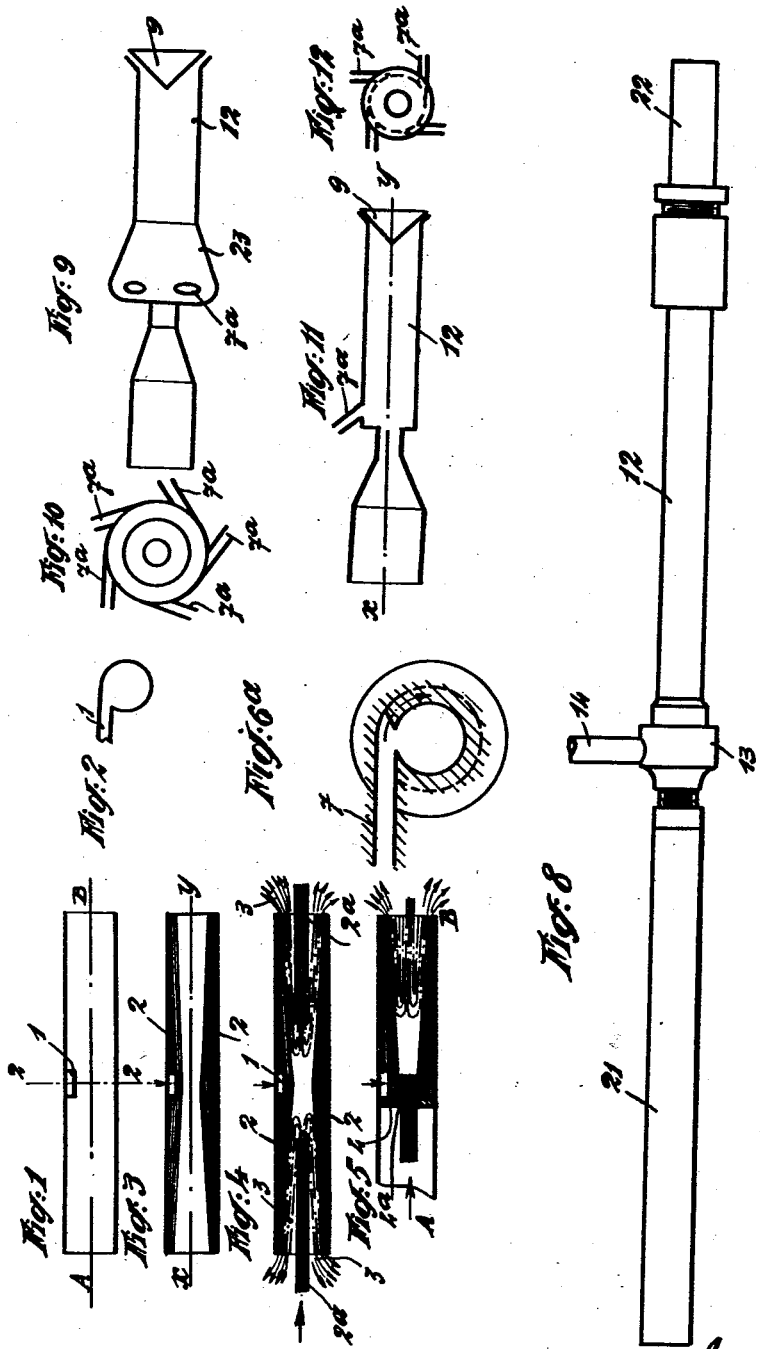
Inventor:
Georges Joseph Ranque,
by Mauro & Lewis,
attorneys.

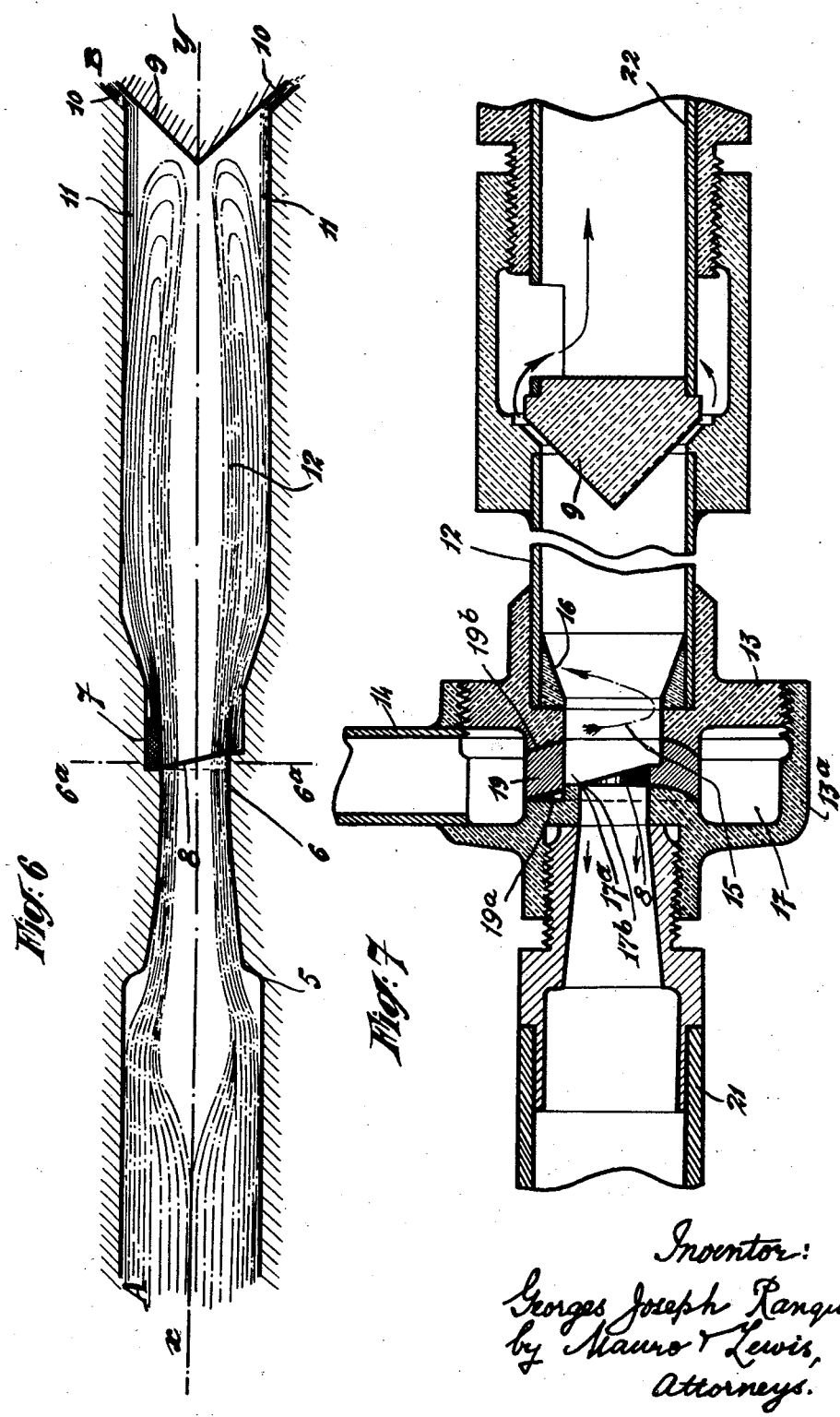

March 27, 1934.   G. J. RANQUE   1,952,281
METHOD AND APPARATUS FOR OBTAINING FROM A FLUID UNDER PRESSURE
TWO CURRENTS OF FLUIDS AT DIFFERENT TEMPERATURES
Filed Dec. 6, 1932   3 Sheets-Sheet 3
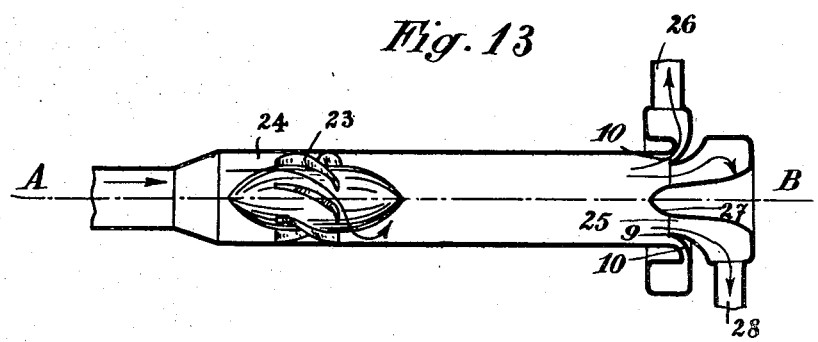
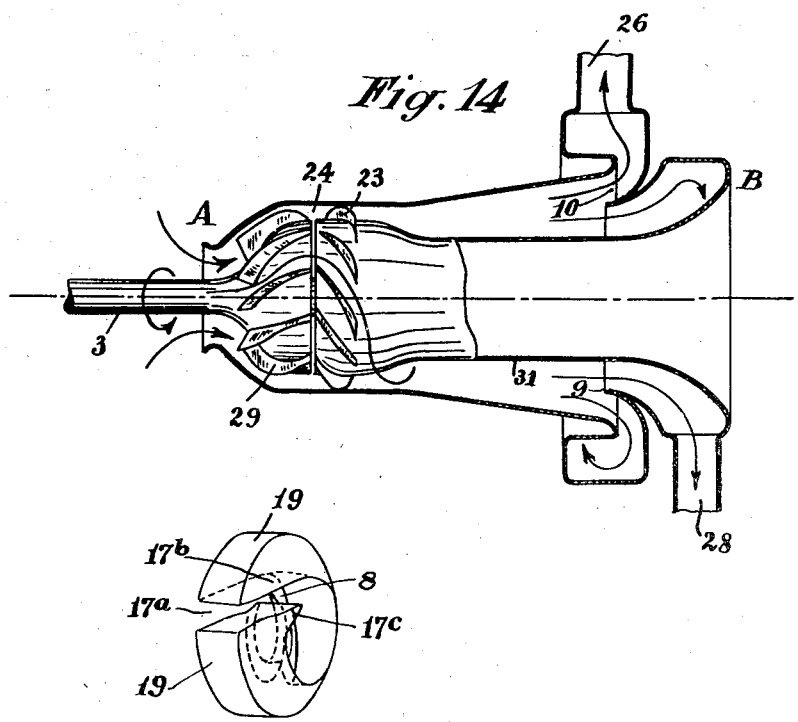

Patented Mar. 27, 1934

1,952,281

UNITED STATES PATENT OFFICE 1,952,281

METHOD AND APPARATUS FOR OBTAINING FROM A FLUID UNDER PRESSURE TWO CURRENTS OF FLUIDS AT DIFFERENT TEMPERATURES

Georges Joseph Ranque, Montlucon, France, assignor to La Giration Des Fluides, Societe a Responsabilite Limitee, Montlucon, France, a company of France Application December 6, 1932, Serial No. 646,020
In France December 12, 1931

15 Claims. (Cl. 62—170)

The object of my invention is a method for automatically obtaining, from a compressible fluid (gas or vapour) under pressure, a current of hot fluid and a current of cold fluid, that transformation of the initial fluid into two currents of different temperatures taking place without the help of any movable mechanical organ, merely through the work of the molecules of fluid upon one another.

The method according to my invention consists essentially in dividing the fluid under pressure, which is admitted tangentially into a vessel having the shape of a body of revolution, into two coaxial sheets of fluid moving with a gyratory motion and reacting upon each other so as to produce, under the action of centrifugal force, the compression of the outer sheet by the inner sheet which expands, this compression absorbing a certain amount of work, which is evidenced by a rise in the temperature of the compressed sheet at the expense of the other sheet, which is thus cooled.

In a practical mode of carrying out this method, the fluid under pressure is introduced tangentially into a vessel having the shape of a body of revolution provided with axial orifices disposed on either side of the fluid inlet. Said fluid is suitably guided so as to give it a helical motion toward one of said orifices, the cross section of which is suitably restricted so as to produce a backward motion of a portion of the fluid toward the opposite orifice. This produces two sheets of fluids having opposite axial motions, the inner sheet expanding and compressing the outer sheet, thus supplying heat thereto. A current of hot fluid is thus received through the orifice of restricted cross section, while a current of cold fluid is received through the opposite orifice.

Another object of my invention is to provide an apparatus for carrying out the method above referred to. According to my invention, this apparatus comprises a chamber having the shape of a body of revolution the middle part of which is provided with one or more tangential inlet tubes for the fluid under pressure. Axial orifices are provided at either end of said chamber, one of said orifices, toward which the liquid, or fluid is directed through a suitable guiding with a gyratory motion, having a cross section smaller than that of the sheet of fluid, so that a portion of the latter is driven back toward the opposite orifice in such manner that it is caused to flow over the sheet of fluid that is applied against the wall of the chamber in question.

Preferred embodiments of my invention will be hereinafter described with reference to the accompanying drawings, given merely by way of example, and in which:

Figs. 1 to 5 inclusive are diagrammatical views illustrating the principle of my invention, Fig. 2 being a sectional view on the line 2—2 of Fig. 1;

Fig. 6 is a diagrammatical view of an embodiment of my invention;

Fig. 6a is a sectional view on the line 6a—6a of Fig. 6;

Fig. 7 is a detailed view showing in axial section a practical embodiment of my invention;

Fig. 7a is a perspective view of the helicoidal guide;

Fig. 8 is a corresponding plan view on a smaller scale;

Fig. 9 is a diagrammatical elevational view of another embodiment of my invention;

Fig. 10 is an end view corresponding to Fig. 9;

Fig. 11 is a diagrammatical view of another embodiment of my invention;

Fig. 12 is an end view corresponding to Fig. 11;

Figs. 13 and 14 are diagrammatical views of two other embodiments of my invention.

The principle on which my invention is based is illustrated by diagrammatic Figures 1 to 5. Supposing, as shown in Figs. 1 and 2, that a tube A B is provided in its middle part with a tangential inlet pipe 1 through which a current of a compressible fluid (gas or vapour) under pressure is sent into said tube, said fluid is given in said tube a certain linear velocity parallel with the axis of said tube, said rectilinear movement being combined with a gyratory movement about the axis of the tube. The fluid flows toward both ends of the tube.

As the fluid is moving away from the inlet pipe, its rectilinear velocity, which is parallel with the axis $x\,y$ of the tube, increases, and its angular velocity decreases, so that the fluid spreads along the wall of the tube so as to form a sheet 2 having substantially the shape of a body of revolution about axis $x\,y$ (Fig. 3). In said sheet the molecules are subjected to a pressure which is the higher as they are at a greater distance from the axis of the tube, due to the action of the centrifugal force. At the same time, the flow of the fluid produces a substantial fall of pressure in the central zone of the tube, so that the outer air, which is at the atmospheric pressure, is drawn toward the central zone of the tube, thus forming two axial currents 2a (Fig. 4). When the outer air reaches said central zone, it is driven back toward the outside by the fluid moving with a gyratory movement, thus forming streams 3.

If an annular diaphragm 4, the free central opening 4a of which has a diameter equal to the minimum diameter of the zone in which a fall of pressure is produced, as shown in Fig. 5, is provided in the central part of the tube, on one side of the tangential inlet pipe, the fluid moving with a gyratory movement will flow only toward orifice B, carrying along with it the atmospheric air coming from both orifice A and arifice B.

The method and the apparatus according to my invention are based on the experimental facts that have just been stated.

In the embodiment shown in Figs. 6 and 6a, the apparatus consists of a chamber 5 having the shape of a body of revolution about axis $x\ y$, the middle part 6 of said chamber being of restricted cross section and being provided with a tangential inlet pipe 7 for the fluid (gas or vapour) under pressure. The inner wall of chamber 5 is provided, opposite the opening of said pipe, with a helical guiding surface 8. The orifice A of chamber 5 is freely opened, while the cross section of orifice B is restricted by a kind of frusto-conical diaphragm or deflector 9, so that the fluid under pressure, admitted through pipe 7, is only allowed to flow through an annular aperture 10, which is not sufficient for the amount of fluid fed thereto. The fluid under pressure admitted through pipe 7 and guided by helical surface 8 is simultaneously given a rectilinear motion which causes it to move within chamber 6 toward opening 10, and a rotary motion about axis $x\ y$. The sheet of fluid that is immediately adjacent the wall of the chamber flows out through said opening 10, while the remainder of the fluid, which is prevented from flowing out by diaphragm 9 is subjected to the fall of pressure existing in the central zone of the chamber and is given a backward motion toward orifice A. I thus obtain, according to my invention, a first sheet of fluid 11, moving with a gyratory motion along the inner wall of the chamber, from orifice 7 toward orifice B, and a second sheet of fluid 12 moving with a gyratory motion along the inner surface of the first mentioned sheet in an opposite axial direction, said second sheet of fluid consisting of the difference between the amount of fluid admitted through pipe 7 and the amount of fluid that is allowed to flow out through opening 10. Said sheet of fluid under pressure 12, which moves with a gyratory motion not along the rigid wall of chamber 5, but along the elastic surface of the first mentioned sheet of fluid, tends, on the one hand under the action of the centrifugal force, and on the other hand under the effect of the increase of velocity due to the expansion and to the rotation that take place, to compress the molecules of the first mentioned sheet of fluid. That compression absorbs a certain amount of work, which is evidenced by a loss of heat from the second mentioned sheet to the benefit of the first mentioned one. Consequently, the temperature of sheet 12 falls, while the temperature of sheet 11 rises. Finally, there is obtained through orifice 10 a current of hot fluid, and through orifice A a current of cold fluid.

The initial guiding of the fluid toward one of the orifices is necessary for practical purposes in order to obtain an accurate centering of the central zone of depression or fall of temperature. In the example above described, that guiding is effected through helical inclined surface 8. The following description will show that the same result could be obtained through other guiding means.

The adjustment of the cross section of the outlet orifice at B, which can be obtained through any suitable means makes it possible, by modifying the rates of flow at B and A, to vary the differences between the temperature of the initial fluid and those of the hot fluid and of the cold fluid escaping through outlet orifices B and A respectively.

If, for instance, the cross section of the orifice 10 through which the hot fluid is allowed to flow out is considerably restricted, the rate of flow of the hot fluid is diminished, but the rate of flow of the cold fluid is simultaneously increased so that the heat that is given out from one sheet to the other one causes a considerable rise of the temperature of the hot fluid but a small fall of the temperature of the cold fluid, as compared with that of the initial fluid.

Figs. 7 and 7a show a practical embodiment of my invention.

This embodiment comprises a cylindrical chamber 12 in which the interchange of heat takes place, and an annular distributing organ made of two pieces 13—13a which is provided with an inlet pipe 14 for the fluid under pressure. Said distributing organ comprises an inner cylindrical chamber 15 connected with cylinder 12 through a frusto-conical surface 16, and with annular conduit 17 of the distributing organ through a tangential passage 17a. The guiding helical surface 8 extends from one edge 17b to the other 17c of the orifice of said passage. The tangential passage 17a and the guiding inclined surface 8 are provided in a separate part 19, provided with conical surfaces 19a—19b for the centering thereof between parts 13 and 13a of the distributing organ. On the side opposite to cylinder 12 said distributing organ is connected with a cylinder 21 at the end of which the current of cold fluid is received, while the current of hot fluid passing through the annular orifice provided around conical diaphragm 9 is received through tube 22.

Figs. 9 to 13 show other embodiments of the means for guiding the fluid. In the embodiment of Figs. 9 and 10, said guiding is obtained through several tangential pipes 7a opening into a frustoconical chamber 23 connected with the working chamber 12.

In the embodiment of Figs. 11 and 12, the guiding action is obtained through several pipes 7a opening tangentially into chamber 12, but which are inclined with respect to the axis $x\ y$ of said chamber.

It should be well understood that it is not absolutely necessary, according to my invention, that the fluid under pressure should be admitted tangentially into a chamber having the shape of a body of revolution in which the fluid is divided into two coaxial sheets one of which receives from the other one mechanical work which is transformed into heat. What is necessary is to obtain an annular flow of the fluid moving with a gyratory movement and any means for obtaining that result may be obtained according to my invention. In particular, I may use to this effect directing blades disposed for instance in an inlet conduit coaxial with the chamber in which the interchange of heat takes place.

Furthermore, instead of being provided on either side of the inlet conduit, the axial orifices through which the two sheets of liquid escape may be disposed on the same side of said inlet conduit, the annular orifice for the outflow of the hot fluid surrounding the outlet orifice for the cold fluid. In such an arrangement, the two sheets have parallel axial movements in the same direction, which may be advantageous in some cases for reducing their mutual friction.

Such an arrangement is shown in Fig. 13 in which the fluid is admitted at one of the ends A of the chamber A B having the shape of a body of revolution and is given a gyratory movement by a plurality of blades 23 disposed in an annular tube 24. The other end B of chamber A B is provided with two concentric orifices 10 and 25 disposed in such manner that the outer orifice is limited by a diaphragm 9 so that the fluid moving with a gyratory motion from end A past blades 23 cannot escape entirely through said orifice 10. A part of said fluid is compelled to escape through the inner orifice 25, of smaller diameter, which corresponds to a zone of lesser pressure.

This causes an expansion of that portion of the fluid and it has been ascertained experimentally that said expansion starts as soon as the fluid leaves the directing blades and is continued as far as orifice 25. According to the laws of gyratory flow, said expanding sheet compresses the sheet that surrounds it and that flows out through annular orifice 10 and tube 26. In order to avoid parasitic entrainments, it is advantageous to give also to orifice 25 an annular shape by means of a deflector 27, along which the inner sheet flows before reaching tube 28. To sum up, tube 28 serves to the outflow of a portion of the fluid that is cooled by expansion with production of external work and tube 26 serves to the outflow of the remaining portion of the fluid, which is heated by compression.

Finally, instead of extracting the initial energy that is necessary for the working of the apparatus from a compressed air reservoir, it may be necessary in some cases to make use of mechanical energy for imparting a gyratory movement to the fluid and for giving it the superpressure that is necessary for its flow through the apparatus. To this effect, I may dispose, in concentric relation with the stationary blades that control the inlet of fluid, a plurality of movable blades which are mechanically actuated and are disposed in the same manner as the rotor of an air fan or of a compressor.

Such an arrangement is diagrammatically shown in Fig. 14 in which the initial energy of the fluid is not due to a preliminary compression in a separate apparatus but is imparted thereto in the apparatus itself by means of a rotor with blades 29 which is mechanically driven by a shaft 30.

In this embodiment all the other parts are disposed in the same manner as in the apparatus of Fig. 1, with the exception of deflector 27 which is replaced by an annular body 31 extending along the whole length of chamber A B, which is preferable when the diameter of the latter is relatively large.

While I have described what I deem to be preferred embodiments of my invention, it should be well understood that I do not wish to be limited thereto as there might be changes made in the arrangement, disposition and form of the parts without departing from the principle of my invention. It will be understood that it is advantageous to reduce the interchanges of heat between the various parts and between said parts and the outside by means of suitable heat insulating arrangements. Finally the adjustment of the difference of temperature between the hot sheet of fluid and the cold sheet may be obtained by modifying the ratio of the flows of the hot and cold fluids to the initial flow, which may be produced by modifying the sections or the inlet or outlet pressure of one of the three currents of fluid. In particular, in order to increase the temperature of the hot sheet, I may restrict the section left by diaphragm 9 for the outlet of said sheet or reduce the rate of flow by means of a valve disposed on the outlet pipe for the outflow of the heat fluid, or increase the initial pressure of the fluid admitted into the apparatus or again act on the section or the pressure at the outlet of the cold sheet.

What I claim is:

1. A method of obtaining from a current of a compressible fluid under pressure a current of hot fluid and a current of cold fluid which comprises causing said compressible fluid to flow with a gyratory helical motion along a surface of revolution, and dividing said fluid into two coaxial sheets moving along each other so that the outer sheet is compressed by the inner sheet and by the action of centrifugal force, whereby the work thus produced causes a rise in the temperature of the outer sheet and a fall in the temperature of the inner sheet.

2. An apparatus for obtaining from a current of a compressible fluid under pressure a current of hot fluid and a current of cold fluid, which comprises in combination, a chamber having the shape of a body of revolution, means for causing a current of the said compressible fluid under pressure to form a sheet of fluid moving with a gyratory motion along the inner wall of said chamber, and means for causing a current of fluid under pressure to form another sheet of fluid moving with a gyratory motion along the inner surface of the first mentioned sheet, with a relative movement with respect thereto.

3. An apparatus for obtaining, from a current of a compressible fluid under pressure, a current of hot fluid and a current of cold fluid, which comprises in combination, a chamber having the shape of a body of revolution provided with axial orifices at either end, means for introducing the said compressible fluid under pressure tangentially into the middle part of said chamber, means for helically guiding said fluid toward one of said orifices, and means for partly stopping the last mentioned orifice so as to leave only an annular passage for the outflow of the fluid, the other orifice being open to the atmosphere.

4. An apparatus according to claim 3 in which the last mentioned means are adjustable so as to make it possible to vary the cross section of the annular passage for the fluid.

5. An apparatus for obtaining from a current of a compressible fluid under pressure, a current of hot fluid and a current of cold fluid, which comprises in combination, a chamber having the shape of a body of revolution provided with axial orifices at either end, at least one tangential inlet pipe for the said compressible fluid under pressure opening into the middle part of said chamber, means for helically guiding said fluid from said pipe toward one of said orifices, and a deflector for partly stopping the last mentioned orifice so as to leave only an annular outlet passage for the fluid, the other orifice being open to the atmosphere.

6. An apparatus according to claim 4 in which the means for guiding the compressible fluid consist of a member having a helically inclined surface located opposite the opening of said inlet pipe into said chamber.

7. An apparatus according to claim 4 in which the means for guiding the compressible fluid under pressure consist of a frusto-conical chamber coaxially connected with the first mentioned chamber, the apparatus comprising a plurality of fluid inlet pipes tangentially connected with said frusto-conical chamber.

8. An apparatus for obtaining from a current of a compressible fluid under pressure a current of hot fluid and a current of cold fluid, which comprises in combination, a chamber having the shape of a solid of revolution provided with an axial orifice at either end, a plurality of tangential inlet pipes for the said compressible fluid under pressure opening into said chamber, said pipes being inclined with respect to the axis of said chamber so as to guide the fluid toward one of said orifices, and a defector for partly stopping the last mentioned orifice so as to leave only an annular outlet passage for the fluid, the other orifice being open to the atmosphere.

9. An apparatus according to claim 4 in which said chamber has a restricted cross section between the opening of the inlet pipe and the last mentioned orifice.

10. An appartus according to claim 4 in which there is provided a distributing organ made of two parts located opposite said inlet pipe, the guiding means consisting of a ring provided with a tangential inlet conduit and with an inclined helical surface, which ring is inserted between said two parts of the distributing organ.

11. An apparatus for obtaining from a current of a compressible fluid under pressure a current of hot fluid and a current of cold fluid, which comprises in combination, a chamber having the shape of a surface of revolution, an inlet pipe for introducing a compressible fluid into said chamber, a plurality of directing blades located opposite said pipe for imparting to said fluid a gyratory motion along the inner wall of said chamber and means for dividing said fluid into two concentric sheets so that one of said sheets gives up a portion of its heat to the other sheet.

12. An apparatus for obtaining from a current of a compressible fluid under pressure a current of hot fluid and a current of cold fluid, which comprises in combination, a chamber having the shape of a surface of revolution, means for causing a current of the said compressible fluid under pressure to form a sheet of fluid moving with a gyratory motion along the inner wall of said chamber, and two annular orifices disposed at the same end of said chamber for dividing said fluid into two concentric sheets of fluid so that one of them gives up a portion of its heat to the other one.

13. An apparatus for obtaining from a current of a compressible fluid under pressure a current of hot fluid and a current of cold fluid, which comprises in combination, a chamber having the shape of a surface of revolution an inlet pipe for introducing the said compressible fluid under pressure into said chamber disposed coaxially with said chamber at one end thereof, a plurality of directing blades in said chamber disposed opposite said inlet pipe for imparting to said fluid a gyratory motion along the inner wall of said chamber, and two annular orifices disposed at the opposite end of said chamber coaxially therewith for dividing said fluid into two concentric sheets one of which gives up a portion of its heat to the other one.

14. An apparatus for obtaining from a current of a compressible fluid a current of hot fluid and a current of cold fluid, which comprises in combination, a chamber having the shape of a surface of revolution, mechanical means for driving said compressible fluid into said chamber, directing means for imparting to said fluid a gyratory motion along the inner wall of said chamber, and means for dividing said fluid into two concentric sheets so that one of them gives up a portion of its heat to the other sheet.

15. An apparatus according to claim 14 in which the mechanical means consist of a fan disposed opposite the inlet end of said chamber.

GEORGES JOSEPH RANQUE.